United States Patent
Imai et al.

(10) Patent No.: US 7,071,666 B2
(45) Date of Patent: Jul. 4, 2006

(54) SWITCHING POWER SUPPLY, AND METHOD AND CIRCUIT FOR REGULATING OUTPUT OF THE SAME

(75) Inventors: Takakazu Imai, Tokyo (JP); Takeshi Uematsu, Tokyo (JP); Hiroshi Kawasaki, Tokyo (JP); Koichiro Miura, Tokyo (JP); Ken Matsuura, Tokyo (JP)

(73) Assignee: TDK Corporation, Tokyo (JP)

( * ) Notice: Subject to any disclaimer, the term of this patent is extended or adjusted under 35 U.S.C. 154(b) by 339 days.

(21) Appl. No.: 10/800,679

(22) Filed: Mar. 16, 2004

(65) Prior Publication Data

US 2004/0189273 A1     Sep. 30, 2004

(30) Foreign Application Priority Data

Mar. 28, 2003   (JP)   ............................ 2003-090885

(51) Int. Cl.
  G05F 1/40    (2006.01)
  G05F 1/10    (2006.01)
(52) U.S. Cl. ...................... 323/283; 323/222; 323/284
(58) Field of Classification Search ................ 323/222, 323/225, 273, 274, 282, 283, 284, 299, 351
See application file for complete search history.

(56) References Cited

U.S. PATENT DOCUMENTS

| 5,677,617 A | * | 10/1997 | Tokai et al. ................ 323/222 |
| 6,281,668 B1 | * | 8/2001 | Sudo ........................ 323/299 |
| 6,696,821 B1 | * | 2/2004 | Haraguchi et al. .......... 323/222 |

FOREIGN PATENT DOCUMENTS

| JP | A 04-197075 | 7/1992 |
| JP | A 04-250470 | 9/1992 |
| JP | A 11-75366 | 3/1999 |
| JP | A 2001-251851 | 9/2001 |

* cited by examiner

*Primary Examiner*—Jessica Han
(74) *Attorney, Agent, or Firm*—Oliff & Berridge, PLC (57) ABSTRACT

An output voltage of a switching power supply is regulated to a target value. When the target value of the output voltage is altered, the reference value is changed monotonously and linearly a plurality of times at a plurality of gradients to the altered target value. An input voltage of the power supply is switched in response to a switching pulse with the duty ratio calculated according to a difference between the reference value and the output voltage.

11 Claims, 8 Drawing Sheets

SWITCHING POWER SUPPLY, AND METHOD AND CIRCUIT FOR REGULATING OUTPUT OF THE SAME

BACKGROUND OF THE INVENTION

1. Field of the Invention

The present invention relates to regulating the output of switching power supplies.

2. Related Background Art

Japanese Patent Application Laid-Open No. HEI 11-75366 and No. 2001-251851 disclose switching power supplies which can statically change the output voltage according to the species of the load to apply the output voltage.

Recently, switching power supplies such as DC/DC converters have been required to improve their rising characteristics at the time of starting and dynamically change their output voltage while a load to apply the output voltage is operating. In terms of the rising characteristics at the time of starting, an increasing number of loads have been restricted such that no period with a decreasing output voltage exists until the output voltage reaches a target value upon starting the power supplies. Examples of such loads include PLD, DSP, and CPU. Also, an increasing number of loads have been strictly restricted in terms of rising time. Therefore, it has been desired to change the output voltage monotonously and rapidly. Regarding dynamically changing the output voltage while the load operates, ICs which can suppress the power consumption by applying a dynamically variable output voltage to the load have been under development.

SUMMARY OF THE INVENTION

In general, a switching power supply switches an input voltage while regulating a switching pulse in a feedback manner so as to reduce the difference between a reference value and an output voltage. For dynamically changing the output voltage, a variable reference voltage value may be used for regulating the output voltage. When the switching power supply has a high-speed response characteristic, an overshoot or undershoot may occur in the output voltage if the reference value is drastically changed monotonously by a large gradient. For suppressing overshoots and undershoots, it will be effective if the output voltage is caused to approach the output voltage while the reference value is slowly and monotonously changed at a small gradient. In this case, however, it takes a long time for the output voltage to reach the target value, and therefore the response deteriorates.

It is an object of the present invention to regulate the output of switching power supplies to cause the output to reach the target value rapidly with suppressed overshoots and undershoots.

In one aspect, the present invention relates to a method for regulating an output voltage of a switching power supply to a target value. The method comprises calculating a reference value, calculating a duty ratio according to a difference between the reference value and the output voltage so as to reduce the difference, generating a switching pulse having the calculated duty ratio, and switching an input voltage of the switching power supply in response to the generated switching pulse. Calculating the reference value includes, when the target value of the output voltage is altered, monotonously and linearly changing the reference value a plurality of times at a plurality of gradients to the altered target value.

Calculating the reference value may include linearly changing the reference value at a first gradient and then linearly changing thus changed reference value to the altered target value at a second gradient different from the first gradient. The second gradient may have an absolute value smaller than that of the first gradient.

Calculating the reference value may include linearly changing the reference value at a third gradient and then linearly changing thus changed reference value to the altered target value at a fourth gradient different from the third gradient. The fourth gradient may have an absolute value smaller than that of the third gradient.

Calculating the reference value may include linearly changing the reference value at a gradient with an absolute value gradually decreasing as the reference value approaches the altered target value.

Calculating the reference value may include linearly changing the reference value at a fifth gradient from the target value before being altered and then linearly changing thus changed reference value to the altered target value at a sixth gradient different from the fifth gradient. The fifth gradient may have an absolute value smaller than that of the sixth gradient.

In another aspect, the present invention relates to an output control circuit for regulating an output voltage of a switching power supply to a target value. The switching power supply switches an input voltage in response to a switching pulse. The output control circuit comprises a reference calculator circuit for calculating a reference value, a circuit for calculating a duty ratio corresponding to a difference between the reference value and the output voltage so as to reduce the difference, and a generator circuit for generating the switching pulse having the duty ratio. When the target value of the output voltage is altered, the reference calculator circuit monotonously and linearly changes the reference value a plurality of times at a plurality of gradients to the altered target value.

The reference calculator circuit may linearly change the reference value at a first gradient and then linearly changes thus changed reference value to the altered target value at a second gradient different from the first gradient. The second gradient may have an absolute value smaller than that of the first gradient.

The reference calculator circuit may linearly change the reference value at a third gradient and then linearly changes thus changed reference value to the altered target value at a fourth gradient different from the third gradient. The fourth gradient may have an absolute value smaller than that of the third gradient.

The reference calculator circuit may linearly change the reference value at a gradient with an absolute value gradually decreasing as the reference value approaches the altered target value.

The reference calculator circuit may linearly change the reference value at a fifth gradient from the target value before being altered and then linearly changes thus changed reference value to the altered target value at a sixth gradient different from the fifth gradient. The fifth gradient may have an absolute value smaller than that of the sixth gradient.

In still another aspect, the present invention relates to a switching power supply for generating an output voltage of a target value by switching an input voltage. The switching power supply comprises a switching device for switching the input voltage in response to a switching pulse, and the above output control circuit for generating the switching pulse and supplying the switching device with the generated switching pulse.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in greater detail with reference to the accompanying drawings. To facilitate understanding, identical reference numerals are used, where possible, to designate identical or equivalent elements that are common to the embodiments, and, in subsequent embodiments, these elements will not be further explained.

First Embodiment

Figure 1:
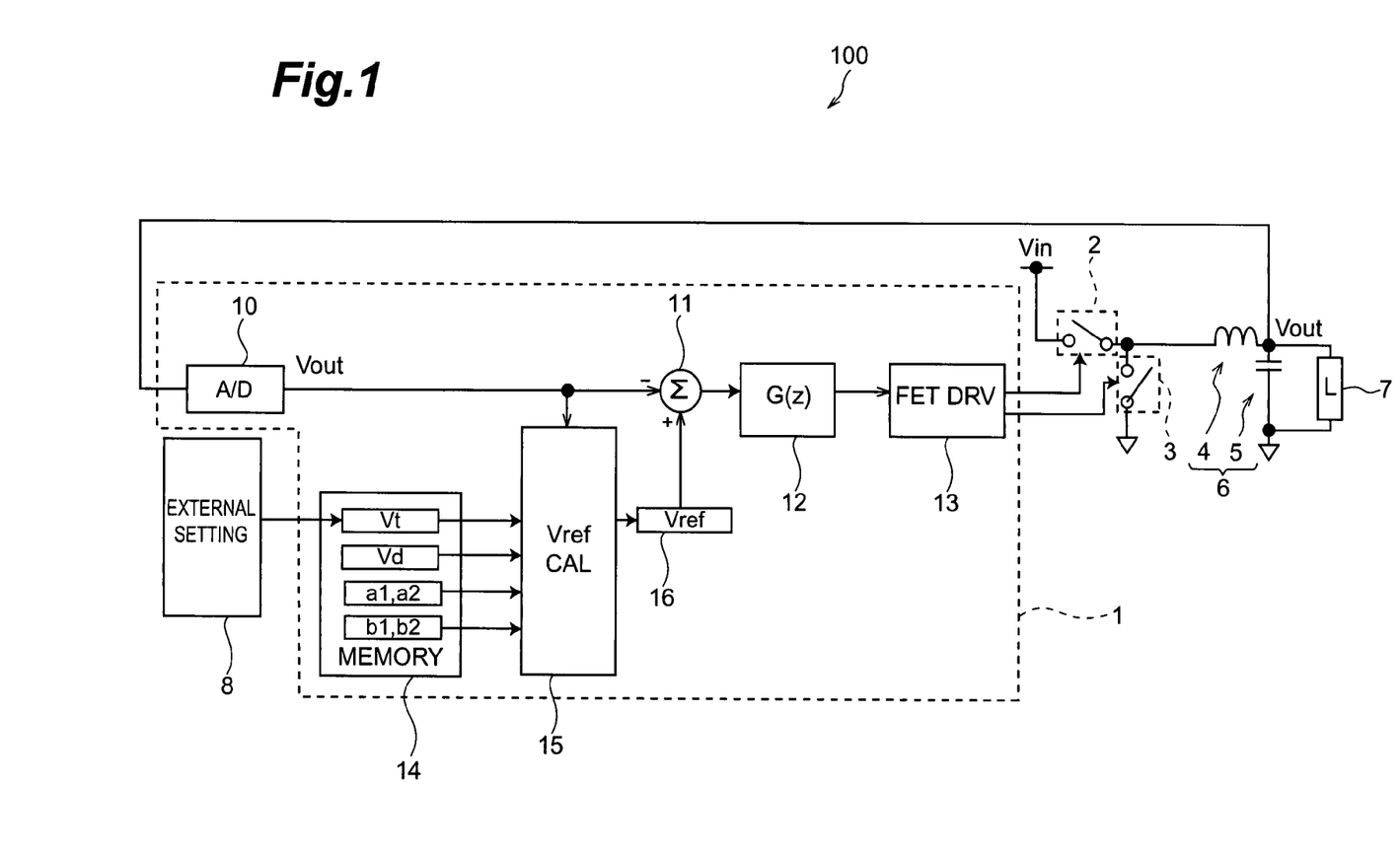
FIG. 1 is a schematic view showing the configuration of a switching power supply in accordance with embodiments.

FIG. 1 is a schematic view showing the configuration of a switching power supply 100 in accordance with the first embodiment. The switching power supply 100 is a DC/DC converter for converting an AC input voltage "Vin" into a DC output voltage "Vout." The DC/DC converter 100 applies the output voltage Vout onto a load 7. By PWM (Pulse Width Modulation), the DC/DC converter 100 turns ON/OFF a switching device, so as to determine the output voltage Vout. The input voltage Vin has a preset value (e.g., 5 V). For the output voltage Vout, a predetermined target value is set according to the load 7. The load 7 is CPU, PLD, or DSP, for example.

The DC/DC converter 100 comprises an output control circuit 1, switching devices 2, 3, an inductor 4, and a capacitor 5. The output control circuit 1 is connected to the output of the DC/DC converter 100 and to the switching devices 2, 3. The output control circuit 1 may be a single integrated circuit (IC) chip. The switching devices 2 and 3 are connected to each other in series. The input voltage Vin is applied to one end of the switching device 2. One end of the switching device 3 is grounded. The inductor 4 is connected to the junction between the switching devices 2, 3. The inductor 4 and capacitor 5 are connected to each other in series, so as to construct a smoothing circuit 6.

The output control circuit 1 generates a switching pulse signal so that the output voltage Vout attains the target value, and regulates the ON/OFF of the switching devices 2 and 3. In this embodiment, each of the switching devices 2, 3 is a field-effect transistor (FET), whereas the switching pulse is a gate pulse for FET. Each of the switching devices 2, 3 is turned ON and OFF upon receiving high and low switching pulses from the output control circuit 1, respectively. Switching operations of the switching devices 2, 3 in response to switching pulses apply onto the smoothing circuit 6 a pulse-like voltage having the same amplitude as that of the input voltage Vin. The smoothing circuit 6 averages the pulse width. The averaged pulse is the output voltage Vout of the DC/DC converter 100.

The configuration of the output control circuit 1 will now be explained in detail. The output control circuit 1 includes an A/D converter 10, a subtracter 11, a switching pulse controller 12, an FET driving circuit 13, a setting value memory 14, a reference calculator circuit 15, and a reference memory 16. The input of the A/D converter 10 is connected to the output of the DC/DC converter 100. The output of the A/D converter 10 is connected to inputs of the subtracter 11 and reference calculator circuit 15. The output of the subtracter 11 is connected to the input of the switching pulse controller 12. The output of the switching pulse controller 12 is connected to the input of the FET driving circuit 13. The setting value memory 14 is connected to an external setting device 8 disposed on the outside of the DC/DC converter 100. Also connected to the setting value memory 14 is the reference calculator circuit 15. The reference calculator circuit 15 is also connected to the reference memory 16. The reference memory 16 is also connected to the input of the subtracter 11.

The analog output voltage Vout of the DC/DC converter 100 is fed into the A/D converter 10. The A/D converter 10 digitizes the analog output voltage Vout, and sends the resulting digital output voltage to the subtracter 11 and reference calculator circuit 15. The reference calculator circuit 15 includes an inner counter. Using the output voltage Vout and various setting values, the reference calculator circuit 15 calculates a reference voltage value "Vref." The setting value memory 14 is a storage device for storing these setting values.

Details stored in the setting value memory 14 will now be explained. The setting value memory 14 stores a target value "Vt", a vertex setting value "Vd", and gradient data "a1", "a2", "b1", "b2" for the output voltage. The output control circuit 1 stabilizes the output voltage Vout of the DC/DC converter 100 at the target value Vt. The target value Vt is specified by the external setting device 8. The external setting device 8 may be the load 7 itself or a switching device connected to the load 7, for example. The vertex setting value Vd is a voltage value specifying a vertex, i.e., bending position, of the reference value Vref changing like a polygonal line. The gradient data a1, a2, b1, b2 are data for specifying gradients of change in the reference value Vref. The vertex setting value and gradient data will be explained later in detail.

The reference calculator circuit 15 sends thus calculated reference value Vref to the reference memory 16. The reference memory 16 is a storage device for storing the reference value Vref. The subtracter 11 receives Vref from the reference memory 16, and performs a subtraction of Vref−Vout. The difference value obtained by this subtraction is sent to the switching pulse controller 12. The switching pulse controller 12 calculates a duty ratio D of the switching pulse so as to reduce the difference between the reference value Vref and output voltage Vout. Specifically, the switching pulse controller 12 calculates the duty ratio D by multiplying the difference value resulting from the subtraction of Vref–Vout by a transfer function G(z).

Thus calculated duty ratio D is sent to the FET driving circuit 13. The FET driving circuit 13 generates a switching pulse, i.e., gate pulse, with the duty ratio D, and sends the generated pulse to the FETs 2, 3. Alternately reversing gate pulses are fed into the FETs 2, 3. As a consequence, the FETs 2, 3 are alternately turned ON and OFF. Specifically, the FET 3 is turned OFF and ON when the FET 2 is turned ON and OFF, respectively. Such switching operations convert the input voltage Vin into a pulse voltage. The smoothing circuit 6 averages the pulse voltage, so as to generate the DC output voltage Vout. According to thus generated output voltage Vout, the output control circuit 1 calculates a duty ratio, and generates a switching pulse again. Such feedback control adjusts the output voltage Vout to the target value.

When the target value Vt is altered by the external setting device 8, the reference calculator circuit 15 monotonously changes the reference value Vref toward the altered target value Vt. The output control circuit 1 adjusts the duty ratio of the switching pulse so as to reduce the difference between the reference value Vref and output voltage Vout, whereby the output voltage Vout changes so as to follow the reference value Vref.

Figure 2:
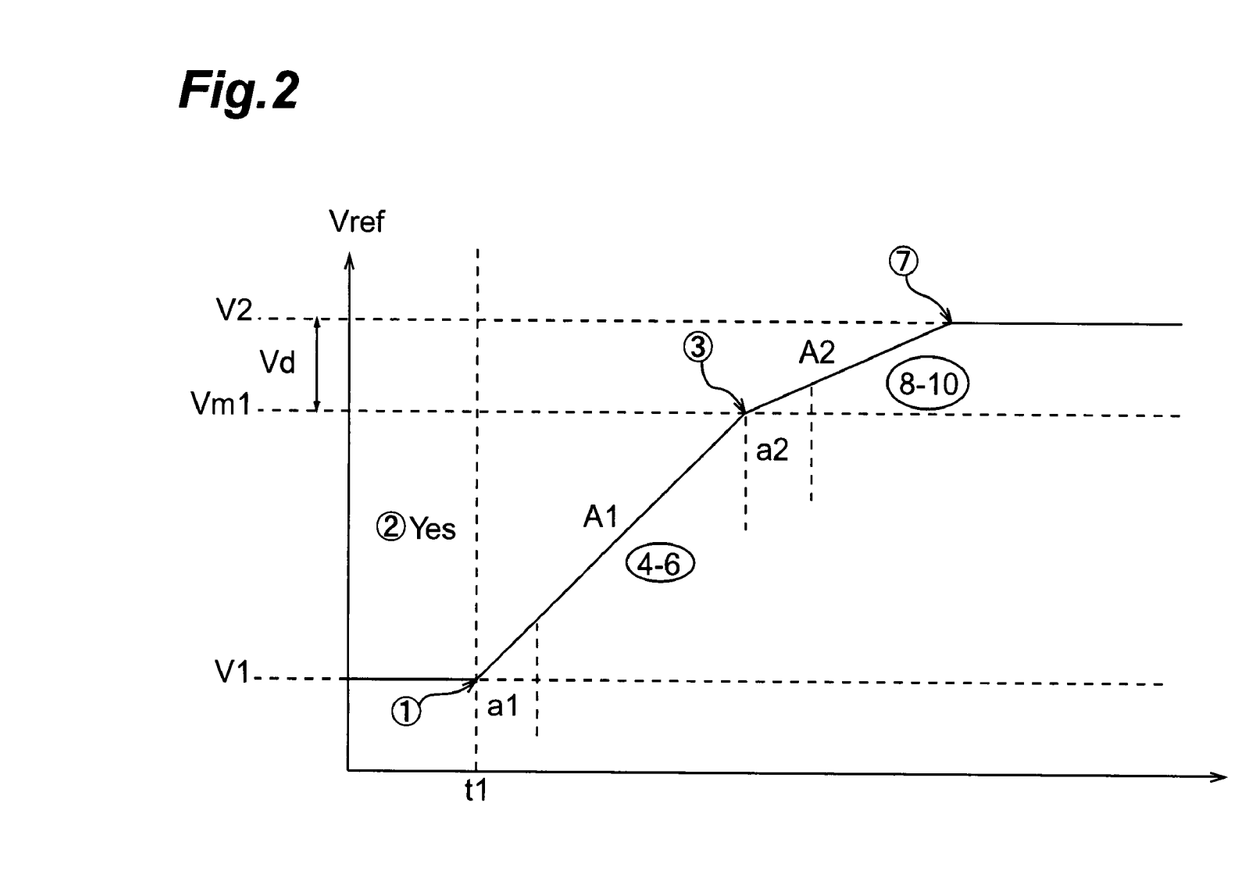
FIG. 2 is a graph showing the increase of reference value in the first embodiment.

One of the features of the present invention lies in the regulation of the reference value Vref when the target value Vt is altered, and the control of the output voltage Vout in conformity to the regulation of the Vref. With reference to FIG. 2, the outline of Vref control in this embodiment will now be explained. FIG. 2 shows the temporal change of the reference value Vref calculated by the reference calculator circuit 15. In FIG. 2, the abscissa and ordinate indicate time and Vref, respectively. Suppose that the target value Vt is altered from V1 to V2 at a time t1. Here, V1<V2. Prior to the time t1, the DC/DC converter 100 is in a steady state, and the reference value Vref and output voltage Vout are stabilized at the target value V1.

When the target value Vt is altered from V1 to V2, the output control circuit 1 gradually shifts the reference value Vref from V1 to V2. In response, the duty ratio is changed, so that the output voltage Vout gradually shifts from V1 to V2. Here, the output control circuit 1 does not linearly change the Vref by a constant gradient, but in two stages with respective gradients different from each other as shown in FIG. 2.

Figure 3:
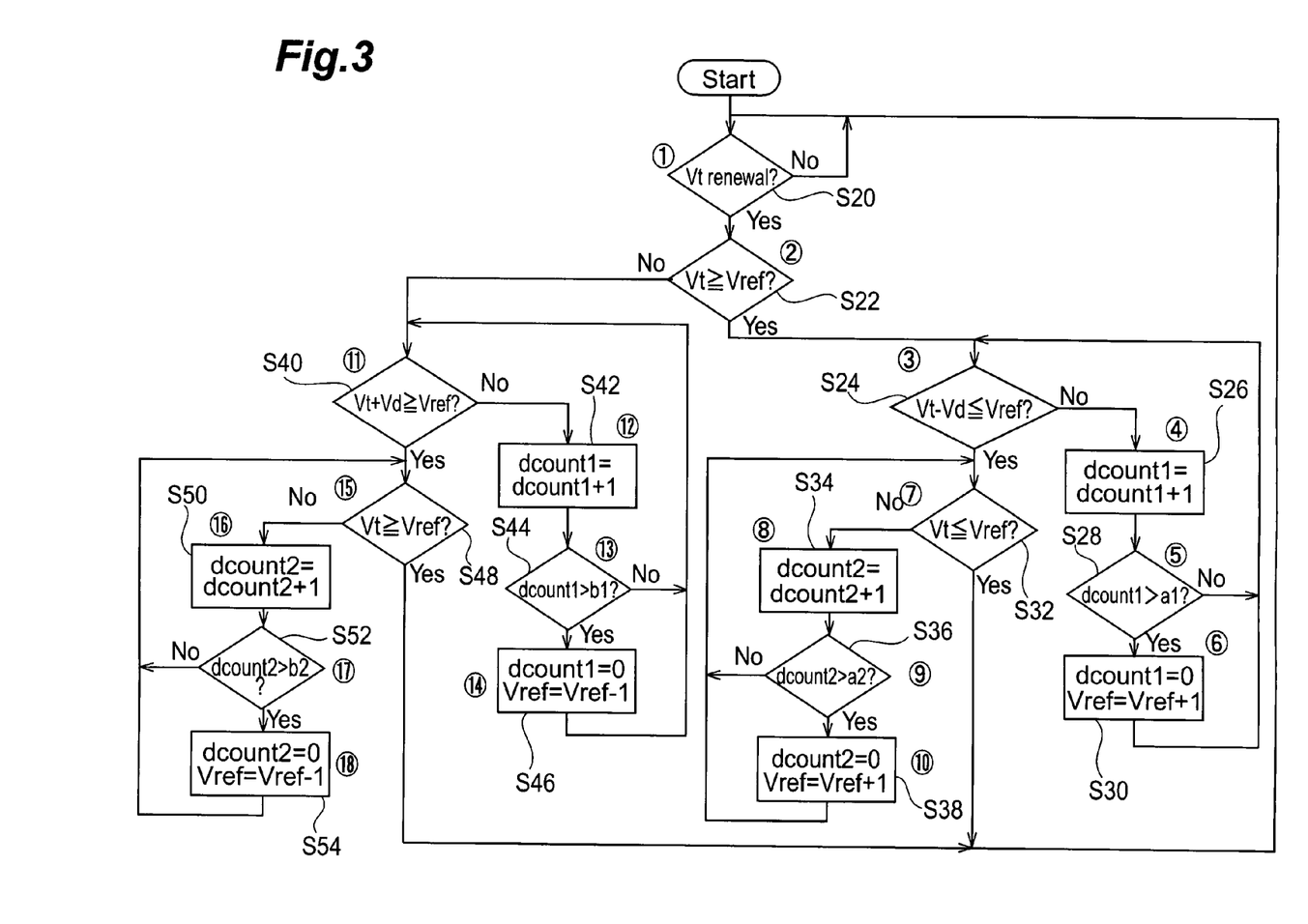
FIG. 3 is a flowchart showing the reference value calculating process.

With reference to FIGS. 2 and 3, the regulation of the reference value Vref will now be explained in further detail. FIG. 3 is a flowchart showing the Vref calculating process executed by the reference calculator circuit 15. The same circled numbers in FIGS. 2 and 3 correspond to each other.

First, as shown in FIG. 3, the reference calculator circuit 15 waits for an update of the target value Vt of output voltage (step S20). If it is determined that Vt is updated by the external setting device 8 ("Yes" in step S20), the reference calculator circuit 15 compares the target value Vt with the reference value Vref (step S22). Here, the altered target value V2 is used as Vt.

When Vt≧Vref ("Yes" in step S22), the reference calculator circuit 15 gradually increases Vref. As shown in FIG. 2, this increase includes a first stage of increase from the target value V1 before being altered to an intermediate value Vm1, and a second stage of increase from the intermediate value Vm1 to the altered target value V2. Thus, Vref monotonously increases like a polygonal line. The intermediate value Vm1 corresponds to a vertex of the polygonal line. The first stage of increase is processed by steps S26 to S30. The second stage of increase is processed by steps S32 to S38.

Using the target value Vt and vertex setting value Vd, the reference calculator circuit 15 calculates the intermediate value Vm1, and compares thus calculated Vm1 with Vref (step S24). Vm1 is calculated by a subtraction of Vt–Vd. Here, the altered target value V2 is used as Vt. Namely, Vm1=V2–Vd. Thus, the vertex setting value Vd is a voltage value specifying the difference between the altered target value and the intermediate value.

When Vm1>Vref, i.e., when the intermediate value Vm1 is greater than the reference value ("No" in step S24), steps S26 to S30 are executed. Steps S26 to S30 monotonously linearly increase Vref from the target value V1 before being altered to the intermediate value Vm1 by a single gradient. Specifically, the reference calculator circuit 15 increases a variable dcount1 indicating the value of the inner counter by 1 (step S26), and then compares the counter value dcount1 with the gradient data a1 (step S28). The gradient data a1 is the amount of increase of counter value dcount1 required for increasing Vref by 1. If dcount1≦a1 ("No" in step S28), the reference calculator circuit 15 returns the processing to step S24 without increasing Vref. If dcount1>a1 ("Yes" in step S28), by contrast, dcount1 is reset to 0, and Vref is increased by 1 (step S30). Thus, the reference calculator circuit 15 increases Vref by 1 each time the counter value dcount1 increases by a1. Therefore, a gradient A1 of Vref shown in FIG. 2 is equivalent to 1/a1. Steps S26 to S30 are repeated until Vref reaches Vm1. Hence, Vref monotonously increases from V1 to Vm1 by the gradient A1 with time.

When Vref reaches Vm1 ("Yes" in step S24), steps S32 to S38 are executed. Steps S32 to S38 monotonously increase Vref from the intermediate value Vm1 to the altered target value V2 by a single gradient. Specifically, the reference calculator circuit 15 compares Vt with Vref at first (step S32). Here, the altered target value V2 is used as Vt. When Vt>Vref, i.e., when the reference value does not reach the altered target value ("No" in step S32), the reference calculator circuit 15 executes steps S34 to S38 in order to increase Vref by a gradient A2. A2 is determined by the gradient data a2 stored in the setting value memory 14. In this embodiment, the absolute value of the gradient A2 is smaller than the absolute value of the former gradient A1.

The reference calculator circuit 15 increases a variable dcount2 indicating the value of the inner counter by 1 (step S34), and then compares the counter value dcount2 with the gradient data a2 (step S36). The gradient data a2 is the amount of increase of counter value dcount2 required for increasing Vref by 1. If dcount2≦a2 ("No" in step S36), the reference calculator circuit 15 returns the processing to step S24 without increasing Vref. If dcount2>a2 ("Yes" in step S36), by contrast, dcount2 is reset to 0, and Vref is increased by 1 (step S38). Thus, the reference calculator circuit 15 increases Vref by 1 each time the counter value dcount2 increases by a2. Therefore, the gradient A2 of Vref shown in FIG. 2 is equivalent to 1/a2. Steps S34 to S38 are repeated until Vref reaches V2. Hence, Vref monotonously increases from Vm1 to V2 by the gradient A2 with time.

When Vref reaches V2 ("Yes" in step S32), the reference calculator circuit 15 returns the processing to step S20, and waits for an update of the target value Vt again. This stops updating Vref, and the output voltage Vout is stabilized at the altered target value V2.

Figure 4:
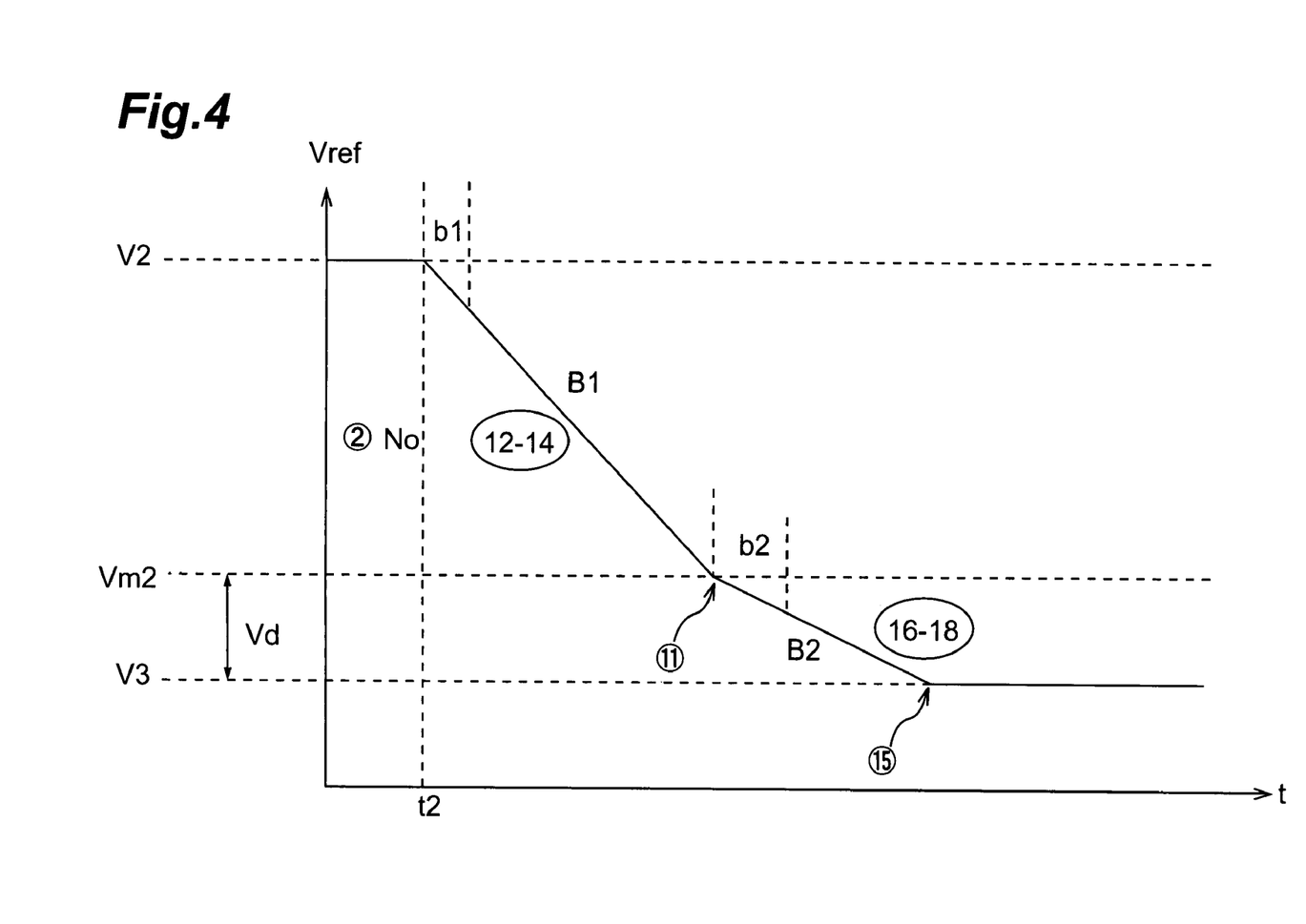
FIG. 4 is a graph showing the decrease of reference value in the first embodiment.

The foregoing is a process for the case where the altered target value is higher than the current target value. A process for the case where the altered target value is lower than the current target value will now be explained with reference to FIGS. 3 and 4. This process is executed when it is determined "No" in step S22 shown in FIG. 3. FIG. 4 shows the temporal change of the reference value Vref when the target value is lowered. In FIG. 4, the abscissa and ordinate indicate time and Vref, respectively. Suppose that the target value Vt is altered from V2 to V3 at a time t2. Here, V2>V3. Immediately before the time t2, the DC/DC converter 100 is in a steady state, and the reference value Vref is stabilized at the target value V2.

When Vt<Vref ("No" in step S22), the reference calculator circuit 15 gradually decreases Vref as shown in FIG. 3. Here, the altered target value V3 is used as Vt. As shown in FIG. 4, this decrease includes a first stage of decrease from the target value V2 before being altered to an intermediate value Vm2 and a second stage of decrease from the intermediate value Vm2 to the altered target value V3. Thus, Vref monotonously decreases like a polygonal line. The intermediate value Vm2 corresponds to a vertex of the polygonal line. The first stage of decrease is processed by steps S42 to S46. The second stage of decrease is processed by steps S50 to S54.

Using the target value Vt and vertex setting value Vd, the reference calculator circuit 15 calculates the intermediate value Vm2, and compares thus calculated Vm2 with Vref (step S40). Vm2 is calculated by an addition of Vt+Vd. Here, the altered target value V3 is used as Vt. Namely, Vm2=V3+Vd.

When Vm2<Vref, i.e., when the reference value is greater than the intermediate value Vm2 ("No" in step S40), steps S42 to S46 are executed. Steps S42 to S46 monotonously linearly lower Vref from the target value V2 before being altered to the intermediate value Vm2 by a single gradient. Specifically, the reference calculator circuit 15 decreases the variable dcount1 indicating the value of the inner counter by 1 (step S42), and then compares the counter value dcount1 with the gradient data b1 (step S44). The gradient data b1 is the amount of increase of counter value dcount1 required for decreasing Vref by 1. If dcount1≦b1 ("No" in S44), the reference calculator circuit 15 returns the processing to step S40 without decreasing Vref. If dcount1>b1 ("Yes" in step S44), by contrast, dcount1 is reset to 0, and Vref is decreased by 1 (step S46). Thus, the reference calculator circuit 15 decreases Vref by 1 each time the counter value dcount1 increases by b1. Therefore, a gradient B1 of Vref shown in FIG. 4 is equivalent to 1/b1. Steps S42 to S46 are repeated until Vref reaches Vm2. Hence, Vref monotonously decreases from V2 to Vm2 by the gradient B1 with time.

When Vref reaches Vm2 ("Yes" in step S40), steps S48 to S54 are executed. Steps S48 to S54 monotonously decrease Vref from the intermediate value Vm2 to the altered target value V3 by a single gradient. Specifically, the reference calculator circuit 15 compares Vt with Vref at first (step S48). Here, the altered target value V3 is used as Vt. When Vt>Vref, i.e., when the reference value does not reach the altered target value ("No" in step S48), the reference calculator circuit 15 executes steps S50 to S54 in order to decrease Vref by a gradient B2. B2 is determined by the gradient data b2 stored in the setting value memory 14. In this embodiment, the absolute value of the gradient B2 is smaller than the absolute value of the former gradient B1.

The reference calculator circuit 15 increases the variable dcount2 indicating the value of the inner counter by 1 (step S50), and then compares the counter value dcount2 with the gradient data b2 (step S52). The gradient data b2 is the amount of increase of counter value dcount2 required for decreasing Vref by 1. If dcount2≦b2 ("No" in step S52), the reference calculator circuit 15 returns the processing to step S48 without decreasing Vref. If dcount2>b2 ("Yes" in step S52), by contrast, dcount2 is reset to 0, and Vref is decreased by 1 (step S54). Thus, the reference calculator circuit 15 decreases Vref by 1 each time the counter value dcount2 increases by b2. Therefore, the gradient B2 of Vref shown in FIG. 4 is equivalent to 1/b2. Steps S50 to S54 are repeated until Vref reaches V3. Hence, Vref monotonously decreases from Vm2 to V3 by the gradient B2 with time.

When Vref reaches V3 ("Yes" in step S48), the reference calculator circuit 15 returns the processing to step S20, and waits for an update of the target value Vt again. This stops updating Vref, and the output voltage Vout is stabilized at the altered target value V3.

As shown in FIGS. 2 and 4, the reference value Vref changes relatively acutely at the time of rising and falling, and then slowly in front of the altered target value. The output voltage Vout changes so as to follow the change in Vref.

Figure 5:
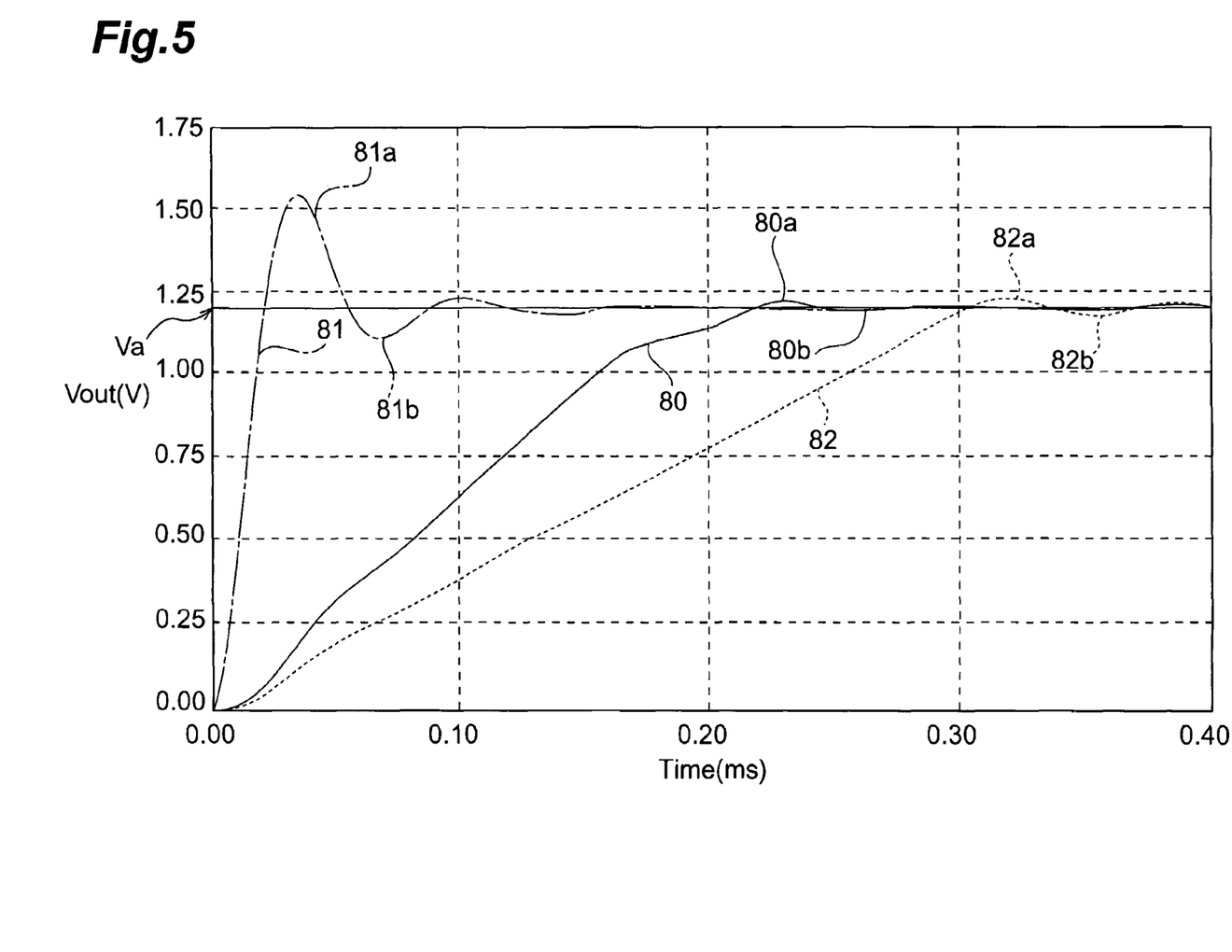
FIG. 5 is a graph showing the increase of output voltage in the first embodiment.

With reference to FIG. 5, advantages of this embodiment will now be explained. FIG. 5 shows a graph 80 indicating the temporal change of output voltage Vout according to the output control method of this embodiment. For comparison, FIG. 5 also shows graphs 81 and 82 indicating respective temporal changes of Vref with respective single gradients. The graph 81 shows the temporal change of Vout obtained when Vref is changed by the above-mentioned gradient A1. The graph 82 shows the temporal change of Vout obtained when Vref is changed by the above-mentioned gradient A2. Here, Vref is increased from 0 to Va.

When Vref is acutely increased by the gradient A1, large overshoot 81a and undershoot 81b occur though Vout reaches Va in a short time as illustrated by the graph 81. When Vref is slowly increased by the gradient A2, it takes a long time for Vref to reach Va though an overshoot 82a and an undershoot 82b are suppressed as illustrated by the graph 82. By contrast, this embodiment can suppress an overshoot 80a and an undershoot 80b and cause the output voltage to reach the target value Va sufficiently rapidly by switching between two gradients A1 and A2 as illustrated by the graph 80. Though FIG. 5 shows the increase in output voltage, similar effects can also be obtained when lowering the output voltage.

When the difference between the gradients A1 and A2 or between the gradients B1 and B2 is too large, overshoots and undershoots may occur at the time of switching between the gradients. Therefore, it is preferred that a plurality of gradients of Vref changes be selected so as to sufficiently suppress overshoots and undershoots at the time of switching between the gradients.

Second Embodiment

The second embodiment differs from the first embodiment in the change of reference value Vref. In the other points, the second embodiment is configured similar to the first embodiment. The configuration of the switching power supply and output control circuit in the second embodiment is shown in FIG. 1.

Figure 6:
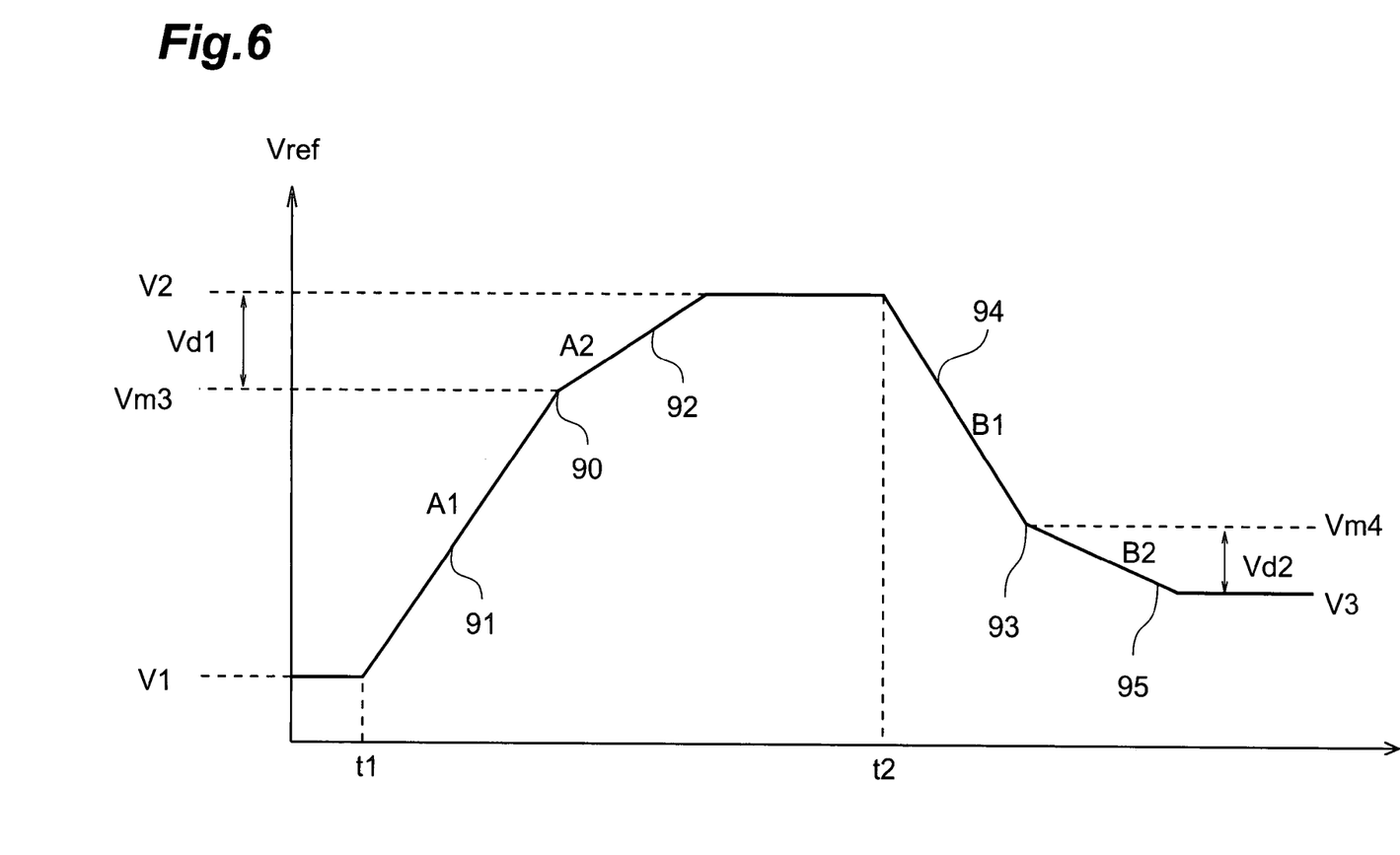
FIG. 6 is a graph showing the temporal change in reference value in the second embodiment.

FIG. 6 shows the temporal change of Vref in the second embodiment. In FIG. 6, the abscissa and ordinate indicate time and Vref, respectively. Suppose that the target value Vt is altered from V1 to V2 at a time t1, and from V2 to V3 at a time t3. Here, V2>V3>V1. Prior to the time t1, the DC/DC converter 100 is in a steady state, and the reference value Vref and output voltage Vout are stabilized at V1. Immediately before the time t3, the DC/DC converter 100 is in a steady state, and the reference value Vref and output voltage Vout are stabilized at V2.

In the first embodiment, a common vertex setting value Vd is used for both increasing and decreasing the reference value Vref, so as to determine the intermediate values Vm1 and Vm2. However, different vertex setting values may be used for increasing and decreasing Vref, respectively. In this embodiment, a vertex setting value Vd1 is used for increasing Vref, and a vertex setting value Vd2, which is different from Vd1, is used for decreasing Vref. Therefore, in FIG. 6, the intermediate value Vm3 equals V2−Vd1, whereas the intermediate value Vm4 equals V3+Vd2.

When the target value Vt is changed, the reference value Vref linearly changes two times by two gradients, respectively, as shown in FIG. 6. As a result, Vref changes like a polygonal line. The ascending polygonal line is constituted by two segments 91 and 92 holding a vertex 90 therebetween. The descending polygonal line is constituted by two segments 94 and 95 holding a vertex 93 therebetween. The segments 91 and 92 have respective gradients A1 and A2 different from each other. The segments 94 and 95 have respective gradients B1 and B2 different from each other. Here, |A1|>|A2|, and |B1|>|B2|. Therefore, Vref changes relatively acutely at the time of rising and falling, and then slowly in front of the altered target value. The output voltage Vout similarly changes so as to follow the change in Vref. Such changes in Vref and Vout are the same as those in the first embodiment. Therefore, this embodiment yields effects similar to those of the first embodiment.

Third Embodiment

The third embodiment differs from the first embodiment in the change of reference value Vref. In the other points, the third embodiment is configured similar to the first embodiment. The configuration of the switching power supply and output control circuit in the third embodiment is shown in FIG. 1.

Figure 7:
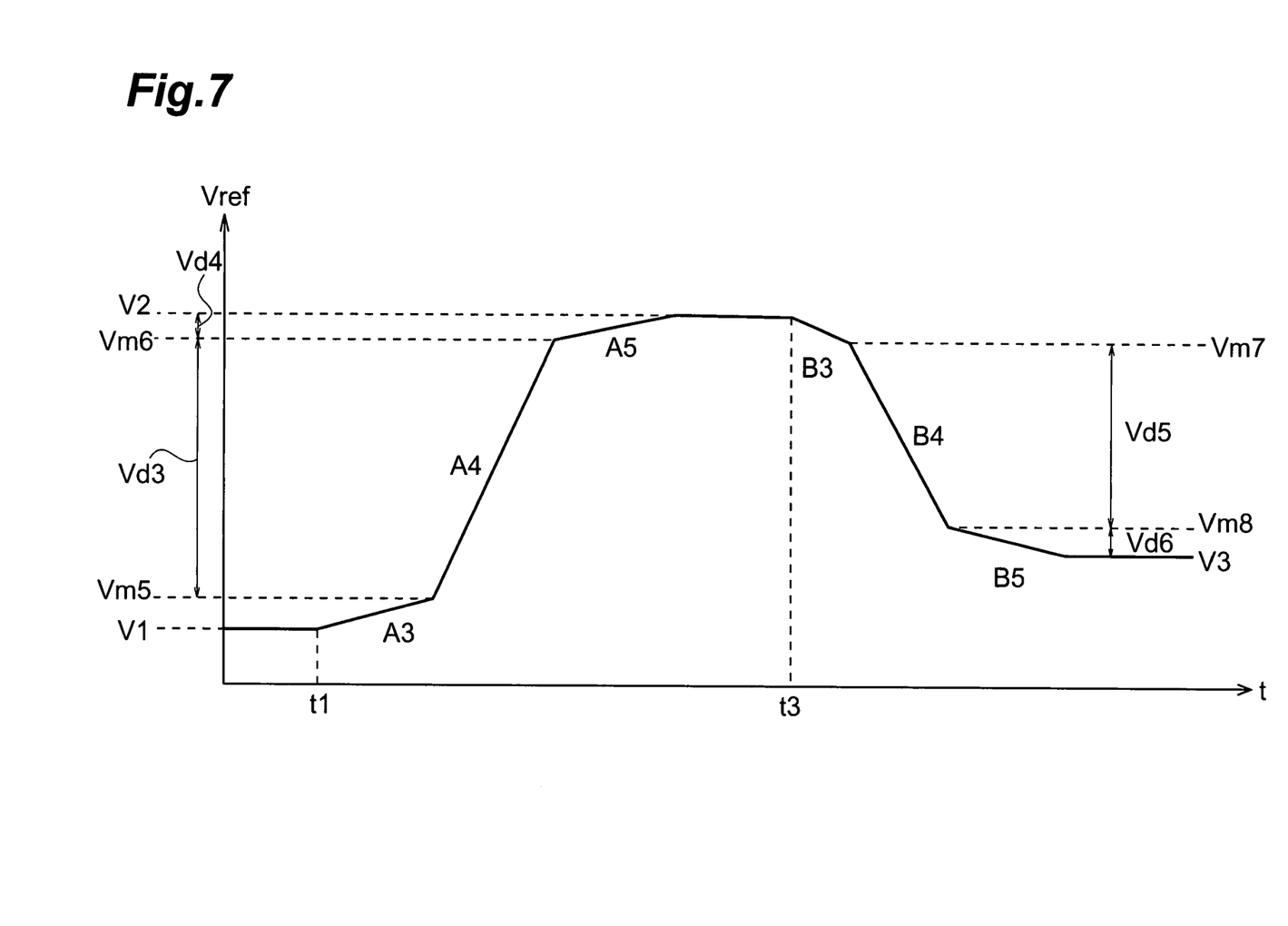
FIG. 7 is a graph showing the temporal change in reference value in the third embodiment.

FIG. 7 shows the temporal change of Vref in the third embodiment. In FIG. 7, the abscissa and ordinate indicate time and Vref, respectively. Suppose that the target value Vt is altered from V1 to V2 at a time t1, and from V2 to V3 at a time t3. Here, V2>V3>V1. Prior to the time t1, the DC/DC converter 100 is in a steady state, and the reference value Vref and output voltage Vout are stabilized at V1. Immediately before the time t3, the DC/DC converter 100 is in a steady state, and the reference value Vref and output voltage Vout are stabilized at V2.

When the target value Vt is altered in this embodiment, the reference value Vref is linearly changed three times by three gradients, respectively. When Vt is altered from V1 to V2, Vref monotonously increases stepwise by gradients A3 to A5 as shown in FIG. 7. Namely, Vref increases from V1 to an intermediate value Vm5 by the gradient A3, then from the intermediate value VM5 to an intermediate value Vm6 by the gradient A4, and thereafter from the intermediate value Vm6 to V2 by the gradient A5. The intermediate values Vm5 and Vm6 are determined by using two vertex setting values Vd3 and Vd4. Here, Vm5=V2−Vd4−Vd3, and Vm6=V2−Vd4.

When Vt is altered from V2 to V3, Vref monotonously decreases stepwise by gradients B3 to B5. Namely, Vref decreases from V2 to an intermediate value Vm7 by the gradient B3, then from the intermediate value Vm7 to an intermediate value Vm8 by the gradient B4, and thereafter from the intermediate value Vm8 to V3 by the gradient B5. The intermediate values Vm7 and Vm8 are determined by using two vertex setting values Vd5 and Vd6. Here, Vm7=V3+Vd6+Vd5, and Vm8=V3+Vd6.

Here, gradient data corresponding to the gradients A3 to A5 and B3 to B5 and the vertex setting values Vd3 to Vd6 are stored in the setting value memory 14.

In this embodiment, |A3|<|A4|>|A5|, and |B3|<|B4|>|B5|. Therefore, Vref changes slowly at the time of rising and falling, then acutely, and thereafter slowly in front of the altered target value.

Since changes at the time of rising and falling are slow, inrush currents can be prevented from occurring. The slow change in Vref at the time of rising is effective for soft-starting the DC/DC converter 100 in particular. Acutely changing Vref after the slow changes at the time of rising and falling shortens the time required for reaching the altered target value. Slowly changing Vref thereafter suppresses overshoots and undershoots.

Fourth Embodiment

The fourth embodiment differs from the first embodiment in the change of reference value Vref. In the other points, the fourth embodiment is configured similar to the first embodiment. The configuration of the switching power supply and output control circuit in the fourth embodiment is shown in FIG. 1.

Figure 8:
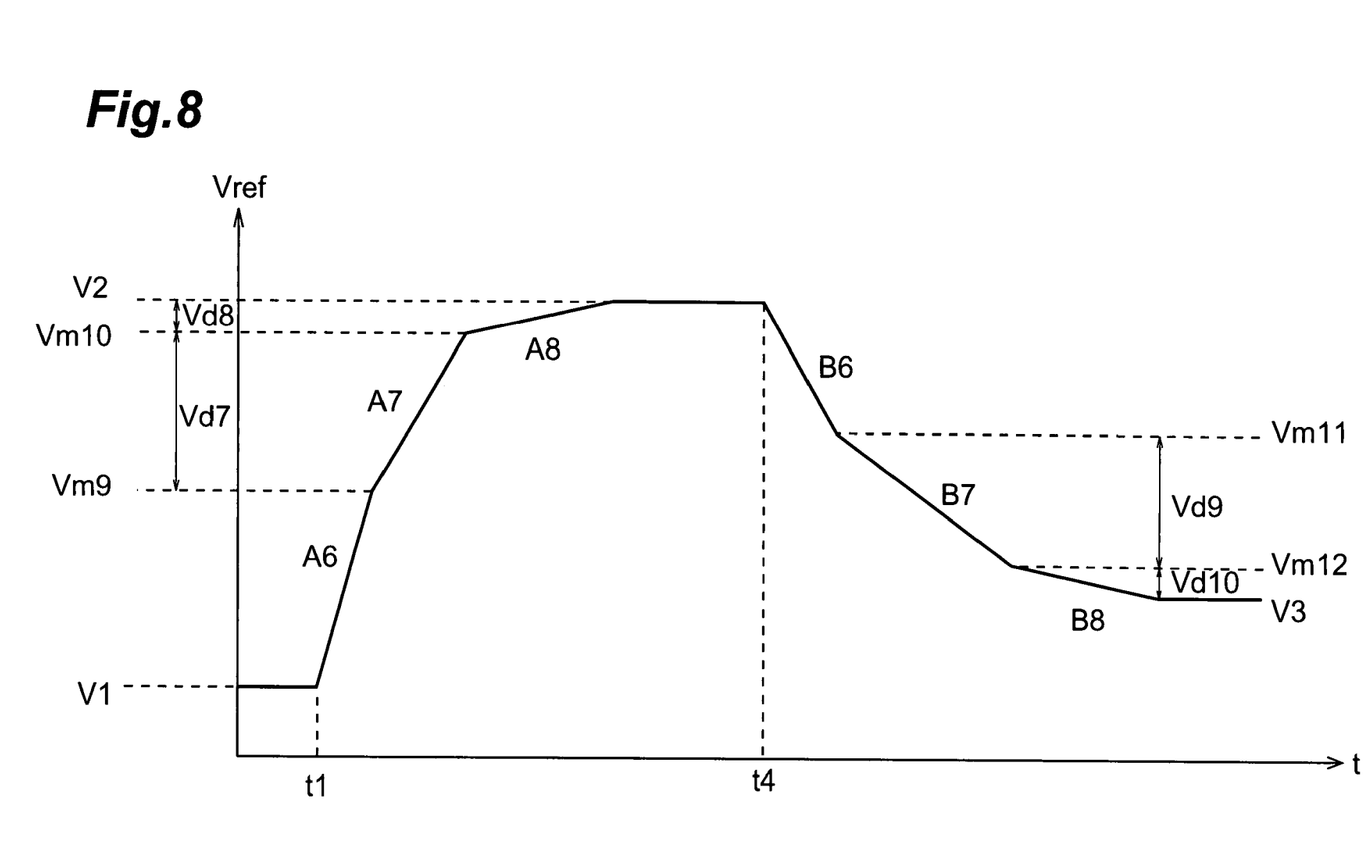
FIG. 8 is a graph showing the temporal change in reference value in the fourth embodiment.

FIG. 8 shows the temporal change of Vref in the fourth embodiment. In FIG. 8, the abscissa and ordinate indicate time and Vref, respectively. Suppose that the target value Vt is altered from V1 to V2 at a time t1, and from V2 to V3 at a time t4. Here, V2>V3>V1. Prior to the time t1, the DC/DC converter 100 is in a steady state, and the reference value Vref and output voltage Vout are stabilized at V1. Immediately before the time t4, the DC/DC converter 100 is in a steady state, and the reference value Vref and output voltage Vout are stabilized at V2.

When the target value Vt is altered in this embodiment, the reference value Vref is linearly changed three times by three gradients, respectively. When Vt is altered from V1 to V2, Vref monotonously increases stepwise by gradients A6 to A8 as shown in FIG. 8. Namely, Vref increases from V1 to an intermediate value Vm9 by the gradient A6, then from the intermediate value Vm9 to an intermediate value Vm10 by the gradient A7, and thereafter from the intermediate value Vm10 to V2 by the gradient A8. The intermediate values Vm9 and Vm10 are determined by using two vertex setting values Vd7 and Vd8. Here, Vm9=V2−Vd8−Vd7, and Vm10=V2−Vd8.

When Vt is altered from V2 to V3, Vref monotonously decreases stepwise by gradients B6 to B8. Namely, Vref decreases from V2 to an intermediate value Vm11 by the gradient B6, then from the intermediate value Vm11 to an intermediate value Vm12 by the gradient B7, and thereafter from the intermediate value Vm12 to V3 by the gradient B8. The intermediate values Vm11 and Vm12 are determined by using two vertex setting values Vd9 and Vd10. Here, Vm11=V3+Vd10+Vd9, and Vm12=V3+Vd10.

Here, gradient data corresponding to the gradients A6 to A8 and B6 to B8 and the vertex setting values Vd9 to Vd12 are stored in the setting value memory 14.

In this embodiment, |A6|>|A7|>|A8|, and |B6|>|B7|>|B8|. Therefore, Vref changes more acutely as closer to the time of rising and falling, and slowly by a gradient whose absolute value gradually becomes smaller as Vref approaches the altered target value. This is a difference from the second embodiment.

In this embodiment, the number of bends of Vref is made greater than that in the first and second embodiments, and the change in Vref is gradually slowed down. As the number of bends increases, Vref can include a greater number of acute changes. This can further shorten the time required for Vref and output voltage Vout to reach the altered target value, and sufficiently suppress overshoots and undershoots. These can be seen when FIG. 8 is compared with FIG. 6.

In the foregoing, the present invention is explained in detail with reference to its embodiments. However, the present invention is not restricted to the above-mentioned embodiments. The present invention can be modified in various manners within the scope not deviating from its gist.

In the above-mentioned embodiments, the reference value Vref is changed by two or three gradients. However, Vref may be changed by four or more gradients. As the number of gradients increases, the time required for the reference value and output voltage to reach their target values can made shorter though the configuration of the reference calculator circuit 15 becomes more complicated.

The vertex setting value Vd stored in the setting value memory 14 may be specified by the external setting device 8. For example, a plurality of vertex setting values Vd may be stored in the setting value memory 14 beforehand, and the external setting device 8 may choose any of the values.

The output control circuit 1 in the above-mentioned embodiments is a digital circuit. However, the output control circuit in accordance with the present invention may be an analog circuit as well.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for regulating an output voltage of a switching power supply to a target value, comprising:
    calculating a reference value;
    calculating a duty ratio according to a difference between the reference value and the output voltage so as to reduce the difference;
    generating a switching pulse having the calculated duty ratio; and
    switching an input voltage of the switching power supply in response to the generated switching pulse,
    wherein calculating the reference value includes, when the target value of the output voltage is altered, monotonously and linearly changing the reference value a plurality of times at a plurality of gradients to the altered target value.

2. A method according to claim 1, wherein calculating the reference value includes linearly changing the reference value at a first gradient and then linearly changing thus changed reference value to the altered target value at a second gradient different from the first gradient, the second gradient having an absolute value smaller than that of the first gradient.

3. A method according to claim 1, wherein calculating the reference value includes linearly changing the reference value at a third gradient and then linearly changing thus changed reference value to the altered target value at a fourth gradient different from the third gradient, the fourth gradient having an absolute value smaller than that of the third gradient.

4. A method according to claim 1, wherein calculating the reference value includes linearly changing the reference value at a gradient with an absolute value gradually decreasing as the reference value approaches the altered target value.

5. A method according to claim 1, wherein calculating the reference value includes linearly changing the reference value at a fifth gradient from the target value before being altered and then linearly changing thus changed reference value to the altered target value at a sixth gradient different from the fifth gradient, the fifth gradient having an absolute value smaller than that of the sixth gradient.

6. An output control circuit for regulating an output voltage of a switching power supply to a target value, the switching power supply switching an input voltage in response to a switching pulse, comprising:
    a reference calculator circuit for calculating a reference value;
    a circuit for calculating a duty ratio corresponding to a difference between the reference value and the output voltage so as to reduce the difference; and
    a generator circuit for generating the switching pulse having the duty ratio,
    wherein, when the target value of the output voltage is altered, the reference calculator circuit monotonously and linearly changes the reference value a plurality of times at a plurality of gradients to the altered target value.

7. An output control circuit according to claim 6, wherein the reference calculator circuit linearly changes the reference value at a first gradient and then linearly changes thus changed reference value to the altered target value at a second gradient different from the first gradient, the second gradient having an absolute value smaller than that of the first gradient.

8. An output control circuit according to claim 6, wherein the reference calculator circuit linearly changes the reference value at a third gradient and then linearly changes thus changed reference value to the altered target value at a fourth gradient different from the third gradient, the fourth gradient having an absolute value smaller than that of the third gradient.

9. An output control circuit according to claim 6, wherein the reference calculator circuit linearly changes the reference value at a gradient with an absolute value gradually decreasing as the reference value approaches the altered target value.

10. An output control circuit according to claim 6, wherein the reference calculator circuit linearly changes the reference value at a fifth gradient from the target value before being altered and then linearly changes thus changed reference value to the altered target value at a sixth gradient different from the fifth gradient, the fifth gradient having an absolute value smaller than that of the sixth gradient.

11. A switching power supply for generating an output voltage of a target value by switching an input voltage, comprising:
    a switching device for switching the input voltage in response to a switching pulse; and
    an output control circuit according to claim 6 for generating the switching pulse and supplying the switching device with the generated switching pulse.

* * * * *